Oct. 4, 1955 C. R. A. GRANT 2,719,431
VACUUM GAUGES
Filed Feb. 14, 1951
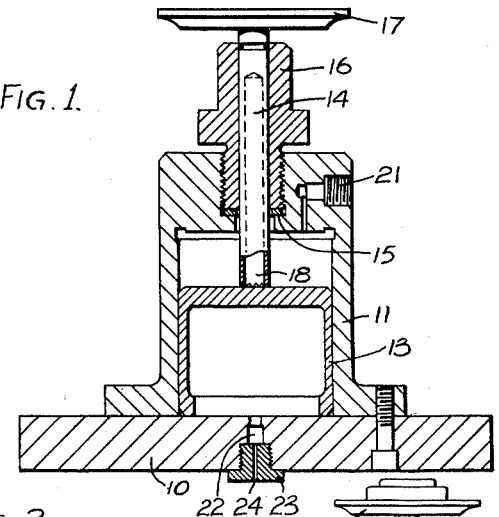
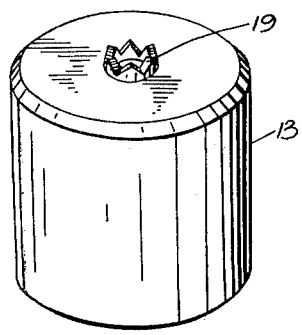
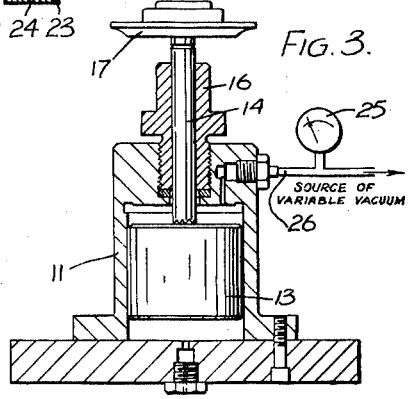
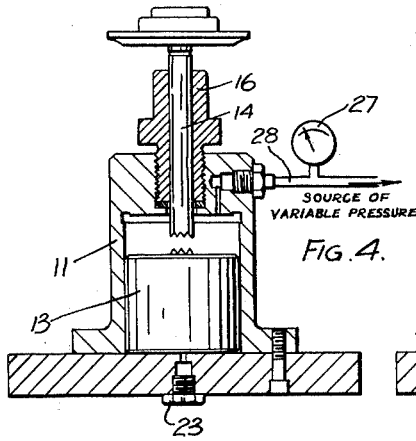
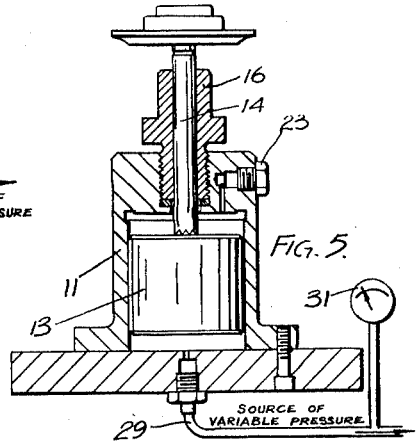
INVENTOR:
Charles Robert Archibald Grant
BY:
Stevens, Davis, Miller & Mosher
ATTORNEY United States Patent Office 2,719,431
Patented Oct. 4, 1955

2,719,431

VACUUM GAUGES

Charles Robert Archibald Grant, London, England, assignor to Pressure Gauges Limited, Dublin, Ireland Application February 14, 1951, Serial No. 210,823

2 Claims. (Cl. 73—419)

This invention relates to vacuum gauges of the kind which determines vacuum directly in terms of a force acting over a known area, and which may be used for the calibration of the more common type of vacuum gauge employing a Bourdon tube or like elastic container.

In the present specification, the word "vacuum" refers to the amount by which a fluid pressure is less than the ambient atmospheric pressure.

It is at present usual to employ a mercury column for vacuum determination, but there are a number of objections to its use such as variation in mercury density due to contamination, impossibility of accurately determining the exact position of the top of a mercury column due to the meniscus, adhesion of mercury to the glass tubes after a long period of use, and the fragile construction of the mercury apparatus which, of necessity, must employ glass.

The object of the present invention is to provide a vacuum gauge which avoids the above mentioned objections. In addition, the invention sets out to provide a gauge where the observation of the pressure does not require accurate reading of the position of an indicator.

In accordance with the present invention, a vacuum gauge comprises a cylinder disposed with axis vertical and having its upper end closed against entry of fluid with the exception of a port connecting the upper part of the cylinder to a source of vacuum, and its lower end open to the atmosphere, a piston in the cylinder slidable therein in a fluid-tight manner, and means for loading the piston with weights to counterbalance the force acting upwardly on the piston as a result of the pressure difference between its upper and lower sides.

Preferably, the means for loading the piston comprises an elongated plunger extending through a sealing gland in the cylinder above the piston to contact the piston, the plunger carrying at its upper end a pan or similar means by which the plunger may be loaded with weights. Such a plunger if it is not directly connected to the piston will enable the gauge to be used also as a pressure gauge to determine the amount by which a fluid pressure is greater than atmospheric pressure (referred to in this specification as positive pressure), since when pressure is applied above the piston it will fall to the bottom of the cylinder, leaving the weighted plunger to be balanced against the fluid pressure. Further, if the upper side of the piston in the cylinder is opened to the atmosphere and the under side of the piston is connected to a source of low pressure, the latter may be determined by weights applied to the plunger.

In order that the invention may be clearly understood, one embodiment thereof will now be described with respect to the accompanying drawings, in which:

Figure 1 is a detailed cross section of the gauge;

Figure 2 is a perspective view of the piston;

Figure 3 is a diagrammatic view showing the gauge in use for measuring a vacuum and calibrating a vacuum gauge;

Figure 4 is a diagrammatic view showing the gauge in use for measuring high positive pressures; and Figure 5 is a diagrammatic view showing the gauge in use for measuring low positive pressures.

Referring to Figures 1 and 2, the gauge comprises a base 10 on which is secured in an air tight manner cylinder 11, a piston 13 in the cylinder 11, a plunger 14 located in the upper part of the cylinder 11 and coaxial therewith, a sealing gland 15 engaging the plunger and a guide 16 screwing into the upper part of the cylinder to act also to tighten the sealing gland 15. At the upper end of plunger 14 a pan 17 is positioned to receive weights. The lower part of the plunger 14 is hollow and at the very end 18 is serrated to co-operate with serrations 19 centrally positioned on the upper surface of piston 13. The purpose of these serrations is so that the plunger 14 may be rotated to cause a shaking movement of the piston, which enables the latter to move more easily against friction and viscosity of the lubricating oil employed. Screw threaded connecting ports 21 and 22 give access respectively to the upper end and the lower end of cylinder 11, the operative connection being made to one of these ports whilst the other is left open to the atmosphere. A plug 23 having a small centrally positioned bleed hole 24 is screwed into the port left open to the atmosphere with the object of damping down violent movements of the piston. For purposes of lubrication any oil such as is used in vacuum pumps and having a low vapour pressure may be used.

In use as a vacuum gauge for calibrating a normal type of vacuum gauge 25, plug 23 is screwed into the bottom port 22 and a connection 26 from a source of variable vacuum is taken to port 21. The gauge 25 is connected to connection 26 at a point closely adjacent the port 21. Weights corresponding to a certain vacuum are placed on the pan 17 and the vacuum is varied so that the piston lifts and supports the plunger, it being ensured that the piston does not reach the upper limit of its travel. Rotation of the pan causes a vibrating force to be applied to the piston by serration 19 and any tendency for movement in one direction or the other is noted, the vacuum being adjusted to correct this. When no tendency to move can be detected, the position taken by the needle of gauge 25 is marked at the particular vacuum determined by the weights. The weights are then altered and another vacuum is determined and the position occupied by the needle of gauge 25 marked. It will be appreciated that the vacuum in each case is determined by the total weight of piston, plunger, pan and weights acting over the difference in cross sectional areas of the plunger and piston.

In use as a high positive pressure gauge for calibrating a pressure gauge as shown in Figure 4, port 21 is connected by connection 28 to a source of variable high pressure and the high pressure gauge 27 to be calibrated is connected to connection 28. Pressure is thus applied above the piston 13 which is urged to the bottom of cylinder 11, the plunger 14 being urged upwardly against the total of its own weight and other weights placed on the pan. This total weight acts over the cross sectional area of the plunger and when the pressure is adjusted so that the plunger is at rest between the limits of its movement, the position occupied by the needle of gauge 27 may be marked. By varying the weights in the pan other pressures may be determined and marked on gauge 27.

In use as a low positive pressure gauge the plug 23 is screwed in port 21 and connection 29 is taken from port 22 to a source of variable positive pressure, the low pressure gauge 31 being connected to the connection 29. The low pressure in this case lifts the piston 13 to contact plunger 14 and acts over the piston cross sectional area against the total weight of piston, plunger, pan and weights. The procedure adopted is the same as that adopted in the calibration of the vacuum gauge.

Whilst it is thus possible on one absolute gauge to calibrate vacuum, low positive pressure and high positive pressure gauges, it is a great advantage to be able to use one standard set of weights for all three purposes, and for this purpose the cross sectional areas of plunger and piston must have predetermined relative and actual sizes. For example, if the plunger cross section were one square inch and the piston section were two square inches, it is possible to use standard pound weights to load the pan, the individual weights of piston and plunger being known and accounted for, of course. Thus when measuring vacuum the total weight acts over the difference in piston and plunger area, i. e. one square inch and the vacuum is determined in pounds per square inch, when measuring high positive pressures the weight acts over the plunger area of one square inch, and when measuring low positive pressures the total weight acts over the piston area of two square inches. In the case of high positive pressures a weight equivalent to the piston weight must be placed on the pan to compensate for the fact that the plunger and piston are separated.

Where it is desired to measure vacuum in inches of mercury, a special set of weights must be employed if simple cross sectional areas are to be retained, together with possibility of measurement of high and low pressures in pounds per square inch. Alternatively, if one mode of pressure measurement only is used, for example, the high positive pressure then by correct sizes of piston and plunger cross section the same set of weights may be used for pressure in pounds per square inch and vacuum in inches of mercury. Thus, for example, if the plunger cross sectional area is ⅛ square inch and the piston cross sectional area 2.67 square inches, then for measuring vacuum the difference of plunger and piston area is 2.545 square inches. When measuring positive pressures the total weight of plunger, pan, weights and compensating weight for the piston, is 1¼ pounds for every 10 pounds per square inch pressure measured. When measuring vacuum the same weights may be used but in this case every 1¼ pound represents a vacuum of 1 inch of mercury.

In another arrangement is is desired to measure vacuum in inches of mercury and low positive pressures where pressure is supplied below the piston 13. Here, for example, the piston is 2.5 square inches cross sectional area, whilst the plunger has a cross sectional area of 1.227 square inches giving a difference in areas of 1.272 square inches. Thus every 2½ pounds weight applied represents 1 pound per square inch pressure or a vacuum of 1 inch of mercury.

Whilst the invention has been described with respect to pounds per square inch and inches of mercury, it is obvious that any units of pressure may be employed and piston and plunger areas and sets of weights made to correspond.

Also it will be appreciated that for the most accurate operation of the gauge the cylinder should be mounted with axis vertical, although, of course, small deviations from the vertical make no substantial difference.

What I claim is:

1. A vacuum gauge comprising a cylinder, a piston axially slidable vertically in said cylinder, said cylinder having ports for fluid flow at each end thereof, a plunger of smaller diameter than said piston mounted for fluid-tight sliding movement axially of said cylinder co-acting means on the lower end of said piston and on the upper end of said plunger to establish a quick detachable frictional slip drive connection therebetween and weighting means positioned on the top end of said plunger.

2. A vacuum gauge comprising a cylinder, a piston axially slidable vertically in said cylinder, said cylinder having ports for fluid flow at each end thereof, a plunger of smaller diameter than said piston mounted for fluid-tight sliding movement, said plunger having serrations on the lower end thereof and said piston having cooperating serrations on the upper surface thereof whereby said serrations engage and disengage to establish a quick detachable frictional slip drive connection therebetween and weighting means positioned on the top end of said plunger.

References Cited in the file of this patent

UNITED STATES PATENTS

| | | |
|---|---|---|
| 235,791 | Lyne | Dec. 21, 1880 |
| 523,417 | Spiller | July 24, 1894 |
| 664,805 | Bosworth | Dec. 25, 1900 |
| 664,806 | Bosworth | Dec. 25, 1900 |

FOREIGN PATENTS

| | | |
|---|---|---|
| 16,632 | Great Britain | June 9, 1910 |
| 524,012 | Great Britain | July 29, 1940 |

OTHER REFERENCES

Bureau of Standards Journal of Research, vol. 6, 1931, pp. 1066, 1067 and 1068 of Research Paper No. 324.